(No Model.)

A. DUDDEN.
KNIFE SHARPENER.

No. 444,522. Patented Jan. 13, 1891.

Witnesses:

Inventor
Alfred Dudden,
By his Attorneys,

UNITED STATES PATENT OFFICE.

ALFRED DUDDEN, OF SANTA BARBARA, CALIFORNIA.

KNIFE-SHARPENER.

SPECIFICATION forming part of Letters Patent No. 444,522, dated January 13, 1891.

Application filed June 28, 1889. Serial No. 315,921. (No model.)

*To all whom it may concern:*

Be it known that I, ALFRED DUDDEN, a citizen of the United States, residing at Santa Barbara, in the county of Santa Barbara and State of California, have invented a new and useful Knife-Sharpener, of which the following is a specification.

This invention has relation to knife-sharpeners, and is especially adapted for family use. Among the objects in view are to provide a neat and tasty device having sharpeners or knives, the opposite edges of which may be adjusted so as to bring different portions into operative position, whereby the life of the sharpener is materially increased, and to combine with the above objects simplicity, cheapness, and durability.

With these general objects in view the invention consists in providing a knife-sharpener consisting of two sections or leaves, preferably formed of hard wood, the same being connected by a hinge at their adjacent lower edges and at their upper ends by an adjusting device adapted to bring the upper edges or ends of the leaves closer to or farther from each other, and, further, in providing each leaf with a knife-plate having a series of cutters, the cutters of one plate preferably alternating with those of the opposite plate in the companion section and adapted to be regulated by means of the adjusting device before mentioned.

Figure 1:
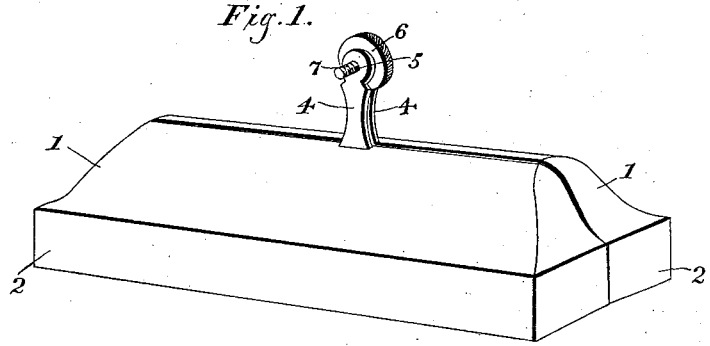
Figure 2:
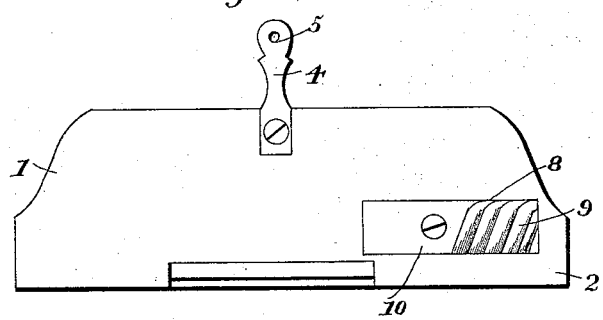
Figure 3:
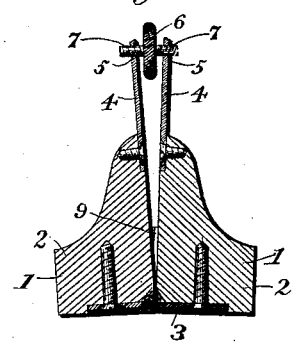
Figure 4:
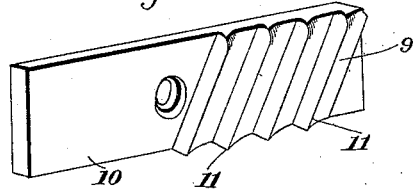

Referring to the drawings, Figure 1 is a perspective of a knife-sharpener constructed in accordance with my invention. Fig. 2 is an inner face view of one of the leaves; Fig. 3, a transverse view; Fig. 4, a detail in perspective of one of the knives or cutters detached.

Like numerals of reference indicate like parts in all the figures of the drawings.

In practicing my invention I form the device in two halves or sections 1, each of which is preferably a fac-simile of the other, and each of which is flared at one side, as at 2, to form a base. The sections 1 are hinged together at about their center at their lower edges, as at 3, and the upper or reduced edges thereof are therefore capable of swinging inward or outward. Each of these sections is provided upon its inner face and at its upper edge with a standard 4, the standard of one section being in line with that in the other, and the two being provided with horizontally-aligning threaded perforations 5.

6 represents a rotatable thumb-nut provided with opposite right and left handed threaded studs 7, each designed to enter one of the perforations formed in its adjacent standard. By means of this nut the sections may be adjusted to or from each other and maintained in their relative position.

The inner face of each of the sections is provided at opposite points and near one end of the device with recesses 8, and in each recess there is mounted the cutting medium 9. The cutting medium in this instance is formed of case-hardened steel, and is of a shape designed to fit the recesses, and consists of a shank or securing-plate 10, and in rear of the same of a series of two or more outwardly-projecting diagonally-arranged cutters 11. The cutting mediums are preferably arranged one slightly in advance of the other, so that the cutters of one plate will be intermediate those in the other, and said cutters projecting slightly beyond the planes or inner faces of their respective sections may by operating the thumb-nut so as to draw the sections together take into each other or cross each other.

The manner of using my invention will at once make itself apparent, in that it is simply necessary to mount the device upon a suitable support—as, for instance, a table—and hold the same with one hand and insert the knife with the opposite hand, lower the knife-blade until the edge takes between the cutters and a bite is formed. Now draw the knife outwardly or toward the rear, and in so doing thin shavings of steel are removed from the opposite edges of the blade. Should one point of contact of the cutters become worn, said point may be changed by operating the thumb-nut and forcing the cutters to mesh with each other more or less.

I prefer to form the sections 1 of hard wood, for the reason that I obviate any marring of the sides of the blade, and all metal that is removed is directly at the edge. I also form an edge that I deem very much better than that usually formed, the edge being in this instance more abrupt or of a V shape in contradistinction to a gradual tapered edge liable to be broken or very easily hacked, and when so hacked necessitating a very great amount of grinding for the purpose of removing the same.

Having described my invention, what I claim is—

The combination, with the opposite leaves 1, the hinge 3, pivotally connecting the lower edges of the leaves, which latter are arranged with their flat faces disposed toward each other and provided with recesses 8 near their lower edges, the plates 10, mounted in each of the recesses, provided with inclined cutters 11, one of said plates being arranged a half-tooth in advance of the other, so that their respective teeth intermesh, and the standards 4, projecting from the free edges of the leaves above the same and provided with oppositely-threaded perforations, and the oppositely-threaded rod 7 and actuating-nut 6, substantially as specified.

In testimony that I claim the foregoing as my own I have hereto affixed my signature in presence of two witnesses.

ALFRED DUDDEN.

Witnesses:
DAVID ROSS DAVIDSON,
CHARLES E. FARRINGTON.